United States Patent

[11] 3,586,988

[72] Inventor Barret B. Weekes
Newport Beach, Calif.

[21] Appl. No. 687,226
[22] Filed Dec. 1, 1967
[45] Patented June 22, 1971

[73] Assignee Newport Laboratories
Newport Beach, Calif.

[54] DIRECT COUPLED DIFFERENTIAL AMPLIFIER
16 Claims, 5 Drawing Figs.

[52] U.S. Cl. ........................................ 330/30D, 330/69, 330/17, 330/20, 330/35
[51] Int. Cl. ........................................ H03f 1/00
[50] Field of Search ........................................ 330/69; 330/30 D

[56] References Cited

UNITED STATES PATENTS

| | | | |
|---|---|---|---|
| 3,015,074 | 12/1961 | Taskett | 330/69 X |
| 3,219,943 | 11/1965 | Gogia et al. | 330/69 |
| 3,275,945 | 9/1966 | Walker et al. | 330/30 |
| 3,353,111 | 11/1967 | Van Wilson | 330/69 |
| 3,389,340 | 6/1968 | Forbes | 328/155 |
| 3,423,689 | 1/1969 | Miller et al. | 330/69 |

*Primary Examiner*—Nathan Kaufman
*Attorney*—Lyon & Lyon

ABSTRACT: A solid-state direct-coupled differential potentiometric amplifier including a differential voltage-to-current $G_m$ amplifier in cascade with a differential current-to-voltage $R_m$ amplifier. The $G_m$ amplifier is driven at a common mode voltage by a common mode voltage amplifier coupled as a power supply thereto, with the common mode voltage being detected at the signal input terminals. It is not necessary to differentially balance the differential gain-determining network of the $G_m$ amplifier, nor the feedback resistors which determine the transresistance of the $R_m$ amplifier.

Figures 1, 2A, 3A, 3B:
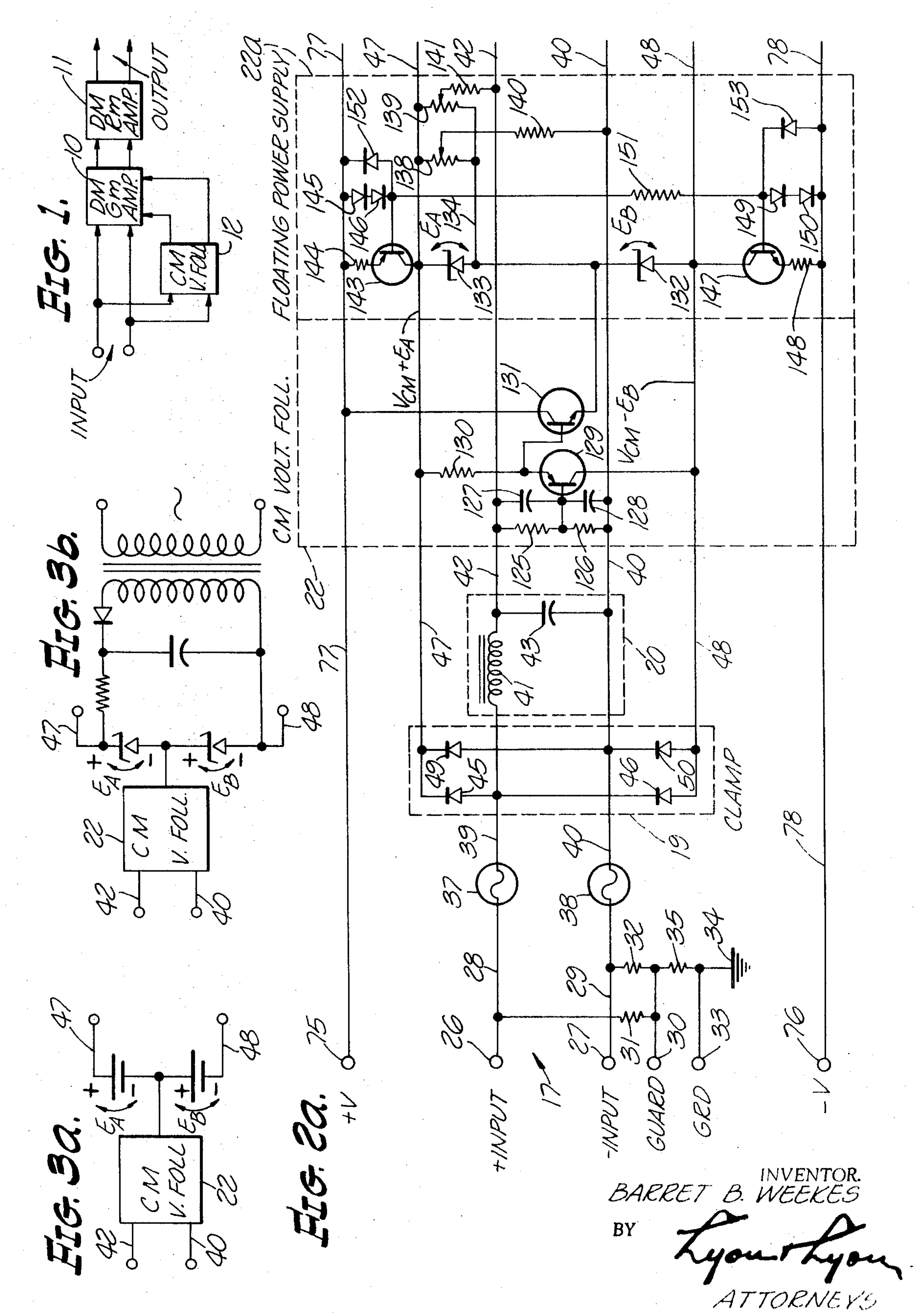

INVENTOR.
BARRET B. WEEKES
BY Lyon & Lyon
ATTORNEYS

INVENTOR.
BARRET B. WEEKES
BY Lyon & Lyon
ATTORNEYS

DIRECT COUPLED DIFFERENTIAL AMPLIFIER

This invention relates to amplifiers, and more particularly to a new direct-coupled differential amplifier having improved common mode rejection characteristics. Stringent requirements are imposed upon amplifiers employed in data acquisition and instrumentation applications in which low-level signals emanating from transducers, such as thermocouples, strain gages, and so forth, must be amplified. In many instances, the ground of the transducer is at a different voltage than is the ground of the amplifier, or the transducer or input signal cables are in close proximity to a large energy radiator, any of which may cause common mode interference which must be rejected by the amplifier.

A common mode signal is one which is present in a system and which does not contain information pertinent to the data information desired to be measured. If an input signal to be measured by an amplifier or the like consists of a voltage differential wherein the low-side input is operating at, for example, 5 volts and the high-side input is operating at 5.2 volts, the information content of the signal is 0.2 volts while the common mode signal is 5.1 volts [(5.2+5.0)/2]. In most cases it is desired only to measure the 0.2 volt signal, and thus it is necessary for the amplifier to reject the 5.1 volts and observe only the desired portion of the signal. An amplifier with this capability is referred to as having a common mode rejection ability.

Common mode rejection is the ability of an amplifier or similar device to differentiate between a differential potential present in the incoming signal and a common voltage present on this signal. The simplest form of the common mode voltage is a common DC potential, but a more complex problem, and one which has plagued instrumentation engineers, is that of ground loop producing a common AC potential. One principal technique used over the years in handling a difference in ground potentials between two locations has been to use extreme care in grounding a system or to isolate one or more components from ground.

Elimination of ground loops entirely would eliminate the common mode problem. However, typical instrumentation applications include two or more devices which already have internal grounds and the ground loop cannot be eliminated short of redesigning all of the equipment. For example, a common instrumentation problem is that of a grounded thermocouple, and both the thermocouple and recording device are grounded thereby resulting in a ground loop which may mask any information output from the thermocouple. The problem is compounded where a number of transducers and recording devices are employed.

Various types of amplifiers have been developed in an attempt to overcome these and other problems. For example, common mode rejection or elimination of interference signals from the differential mode or information signals has been accomplished by floating (i.e., electrically isolating) galvanometer-type instruments and recording the information. Transformer coupled chopper stabilized-type amplifiers have been provided but these generally have limited bandwidth and excessive chopper noise. These latter-type amplifiers of necessity generally are bulky and not entirely reliable because of the use of electromechanical choppers and are susceptible to microphonics, and are expensive. Direct-coupled differential potentiometric amplifiers have been developed to overcome some of the difficulties noted above. Theoretically, many of them cannot have differential mode gains of one or less (they are usually limited to gains of five or higher) without the use of input attenuators, and many suffer from inadequate common mode performance at high frequencies and thus resort to common mode input low-pass filters. In these direct-coupled amplifiers, the common mode circuit is an inseparable part of the differential mode circuit and thus the common mode circuit gain must be rolled off at low frequencies to ensure stability of the differential mode circuit.

Accordingly, it is an object of this invention to provide a new and improved direct-coupled differential potentiometric amplifier.

A principal object of this invention is to provide a direct-coupled differential amplifier having improved common mode rejection characteristics without the necessity of balanced passive components for achieving such characteristics.

Another object of this invention is to provide an improved amplifier having high differential mode input impedance.

A further object of this invention is to provide an improved amplifier having high common mode input impedance.

An additional object of this invention is to provide an amplifier of the nature described having a low-output impedance.

Another object of this invention is to provide an amplifier of the nature described having a precise differential mode gain from the differential mode input to the output and a common mode gain very much less than unity.

A still further object of this invention is to provide an improved amplifier having high differential mode input impedance and high common mode input impedance.

Figure 2B:
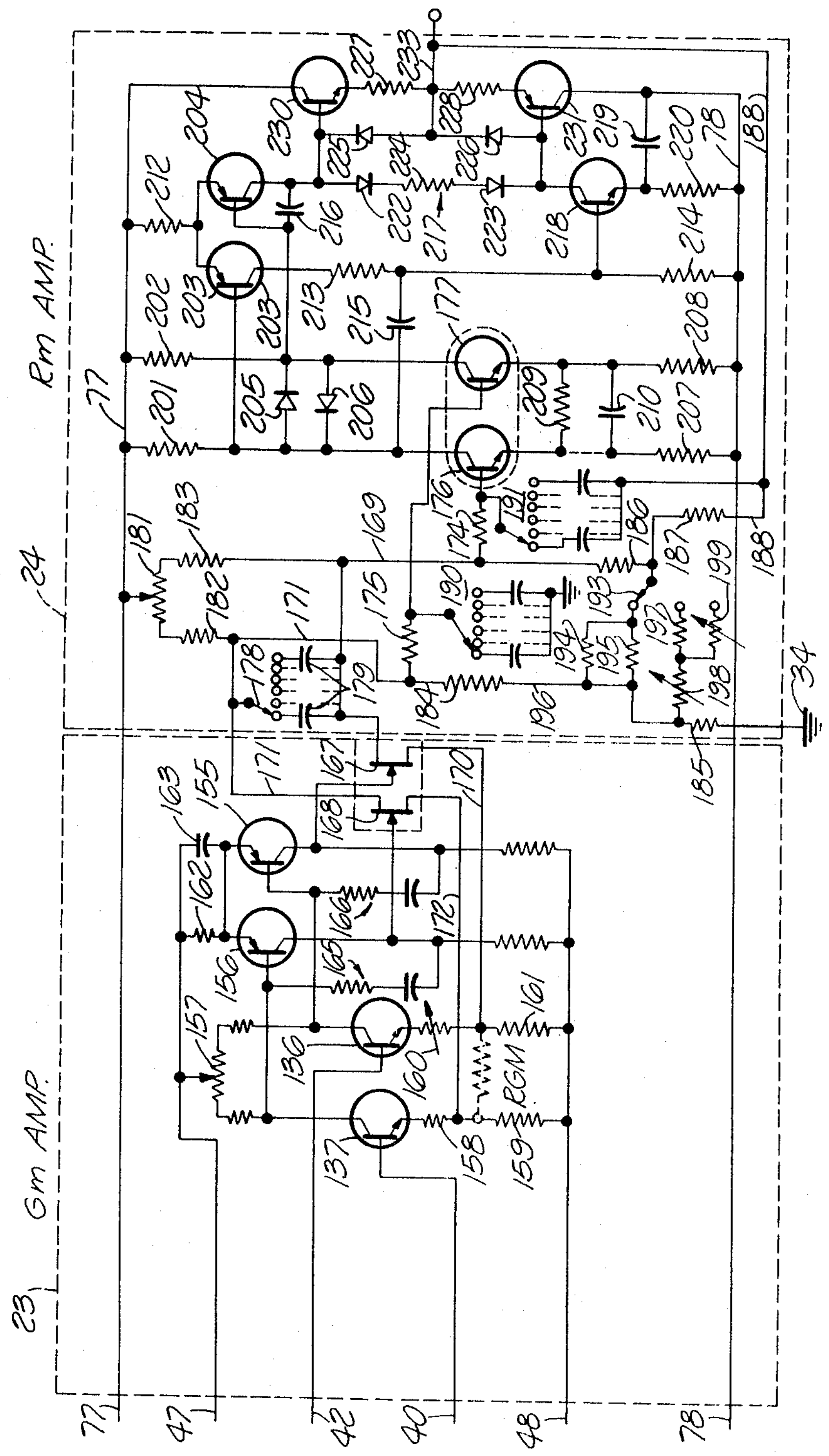

These and other objects and features of this invention will become better understood upon a consideration of the following description taken in conjunction with the drawings in which:

FIG. 1 is a simplified block diagram of an amplifier according to the present invention;

FIGS. 2*a* and 2*b* taken together comprise a circuit diagram of a preferred embodiment of an amplifier according to the present invention; and FIGS. 3*a* and 3*b* illustrate alternative circuits for a portion of the amplifier.

Briefly, in accordance with the teachings of the present invention a novel direct-coupled amplifier is provided including a novel differential voltage-to-current $G_m$ amplifier 10 and a unity gain common mode voltage amplifier 12 whose output drives a floating power supply for the $G_m$ amplifier. The $G_m$ amplifier 10 is connected in cascade with a differential current to voltage $R_m$ amplifier 11. The overall voltage gain of the amplifier is given by the product $G_m R_m$. Either $G_m$ or $R_m$ or both may be varied to change the overall gain. The $G_m$ amplifier accurately converts input voltage into output current which is fed into the $R_m$ amplifier and which in turn accurately converts the current into an output voltage. Common mode rejection is obtained in the $G_m$ amplifier by driving the $G_m$ amplifier at the common mode voltage by the common mode voltage amplifier and taking advantage of the fact that the output of the $G_m$ amplifier approaches an ideal current generator in which the output current is not affected by a change in load voltage. This arrangement ensures a high common mode input impedance thereby eliminating common mode currents from causing an IR drop in the source impedance and thus generating a differential mode signal if a source impedance imbalance exists. Since the $G_m$ amplifier output current is independent of the common mode voltage, the output of the $R_m$ amplifier is not affected by the common mode voltage. The output current of the $G_m$ amplifier approximates an ideal current generator so that the superimposed common mode voltage will not change the $G_m$ amplifier output current and thus change the $R_m$ amplifier output voltage. Selectable filter characteristics, e.g., low pass, band-pass and high pass, may be provided and the filter characteristics are determined by a passive network in the $R_m$ amplifier. The voltage-to-current $G_m$ amplifier is also referred to herein as a transconductance amplifier, and the current to voltage $R_m$ amplifier is also referred to herein as a transresistance amplifier. The common mode voltage amplifier is also referred to herein as a common mode voltage follower inasmuch as the same serves to follow the common mode voltage.

Referring now to FIGS. 2*a* and 2*b*, a diagram of a preferred amplifier according to the present invention includes a signal input circuit 17, an input clamp 19, input filter 20, common mode voltage follower 22 and associated floating power supply **22*a*, differential transconductance, $G_m$, amplifier 23, and a differential transresistance, $R_m$, amplifier 24. Signal input terminals 26 and 27 are coupled to input lines 28 and 29. A guard input terminal 30 is coupled through a resistance 31** to the input line 28 and through a resistance 32 to the input line 29. The guard shield on the transducer leads is connected to the guard input terminal 30 to obtain minimum shut resistance and capacitance between the input leads of the transducer to ground. A ground input terminal 33 is connected to a common ground 34, and a resistance 35 is coupled between ground 34 and the resistances 31 and 32. The resistors 31, 32 and 35 provide a return path to ground for the input current. Fuses 37 and 38 are coupled between the respective input lines 28 and 29 and lines 39 and 40. The line 38 is connected through a choke 41 to an input line 42, and the line 40 is connected directly to the input of the transconductance amplifier. A capacitor 43 is coupled across the lines 42 and 40, and the choke 41 and capacitor 43 comprise an input filter for filtering high frequency noise to reduce the susceptibility of the amplifier thereto if a filter of this nature is desired. The clamp 19 includes diodes 45 and 46 connected between the line 39 and respective lines 47 and 48, and diodes 49 and 50 connected with the line 40 in a similar manner. The clamp 19 serves to clamp the input lines 39 and 40 at the power supply voltage on lines 77 or 78, such as 25 volts. Thus, if the input exceeds the power supply voltage, either one or two of the diodes 45, 46, 49 and 50 will be forward biased and cause either fuse 37 or 38 or both to blow.

The common mode voltage follower 22 has an input network including a pair of series-connected resistances 125 and 126 and a pair of series-connected capacitors 127 and 128 which are both connected in parallel across the lines 42 and 40 which are the data or signal input lines to the $G_m$ amplifier 23. The junctions between these resistances and capacitors are connected together and coupled to the base of a transistor 129 which has its collector coupled to the line 48 and its emitter coupled through a resistance 130 to the line 47. The emitter of the transistor 129 is coupled to the base of a transistor 131 which has its collector coupled to the positive voltage line 77. The emitter of the transistor 131 is coupled through a Zener diode 132 to the line 48 and through a Zener diode 133 to the line 47.

The voltage follower 22 detects the common mode voltage at the input signal lines 42 and 40 by means of the resistors 125 and 126. The capacitors 127 and 128 ensure proper operation of the voltage follower at higher common mode voltage frequencies. The transistors 129 and 131 comprise an emitter follower buffer in cascade to buffer the common mode voltage. The value of the resistor 130 establishes the quiescent operating point of the first emitter follower. The diode 133 establishes a voltage $E_A$ and the diode 132 establishes a voltage $E_B$. This results in the line 47 having impressed thereon the common mode voltage plus $E_A$ and the line 48 having impressed thereon the common mode voltage minus $E_B$. The emitter of the transistor 131 also is connected through a line 134 to the $G_m$ amplifier 23 and the collector of this transistor is connected to the line 77 for purposes which will be described subsequently. A FET (field effect transistor) source follower, comprising a FET or a pair of FETs in cascade, may be used in place of the emitter followers 129 and 131.

The common mode voltage follower 22, in conjunction with the Zener diodes 132 and 133 and current generators coupled with these diodes, serves as a floating power supply for the $G_m$ amplifier 23, and supplies a voltage $Vcm+E_A$ to the line 47 and a voltage $Vcm-E_B$ to the line 48, Vcm being the common mode voltage. This voltage follower does not load the input, i.e., data lines 42 and 40, and has a low output impedance. As noted previously, the voltage follower 22 detects the common mode signal (Vcm) through the resistances 125 and 126; however, this signal alternatively can be derived from the emitters of the first stage of the $G_m$ amplifier 23 and this will not decrease the differential mode input impedance but it will result in some degradation of common mode transient response. The former arrangement, i.e., detecting the common mode signal with the resistances 125 and 126 is preferred because the common mode voltage is sensed directly, and better transient common mode performance results inasmuch as a larger common mode voltage step input can be tolerated and higher frequency components of the common mode signal can be accurately followed.

The output of the voltage follower also may be used to drive the input ground shield or to neutralize shunt common mode impedances from input to ground by driving such impedance with a common mode current.

Some prior amplifiers require a common mode signal input filter to prevent common mode step signals or common mode high frequency signals from saturating the differential amplifier or causing erroneous differential output signals. Such a filter is obviated by the arrangement of the present invention.

The data input lines 42 and 40 (note FIG. 2*b*) are connected to the bases of respective transistors 136 and 137 which form a common emitter first stage for the amplifier 23. A base current neutralizer circuit includes a pair of potentiometers connected in parallel across the lines 47 and 134. The movable contacts of these potentiometers are connected through respective resistances 140 and 141 to the respective input lines 40 and 42. The base current neutralizer circuit essentially is a base bias current supply for the transistors 136 and 137. The base current neutralizer is provided inasmuch as it is preferable not to supply the base bias current from the signal source.

A current source and a current sink which ensure operation of the Zener diodes 132 and 133 within the Zener region are provided. The source includes a transistor 143 having its collector coupled to the line 47 and its emitter coupled through a current determining resistor 144 to the positive voltage supply line 77. A pair of diodes 145 and 146 are connected from the line 77 to the base of the transistor 143 to establish a base voltage on this transistor. The current sink includes a transistor 147 having its collector coupled to the line 48 and its emitter coupled through a current determining resistor 148 to the negative voltage supply line 78. A pair of diodes 149 and 150 are coupled from the line 78 to establish the base voltage on the transistor 147. A resistor 151 is connected between the bases of the transistors 143 and 147 which forward biases diodes 145, 146, 149 and 150.

A diode 152 is connected from the base of the transistor 143 to the line 77, and a diode 153 is connected from the base of the transistor 147 to the line 78. These diodes 152 and 153 operate in conjunction with the clamp 19, and come into play when the clamp becomes active. Although these diodes may be connected respectively from the lines 47 and 48 to the respective lines 77 and 78, the capacitive load from the lines 47 and 48 to ground is minimized by connecting these diodes as shown.

It will be noted that the collector of the second emitter follower 131 in the common mode voltage follower 22 is connected to the positive voltage supply line 77. This is done to prevent any change in the current levels in the current source and sink from being reflected as a current change in the output of the $G_m$ amplifier 23. As will be apparent to those skilled in the art, it is desired that the quiescent output operating current from the $G_m$ amplifier not be changed, and this is prevented by tying the collector of the transistor 131 to the line 77 whereby the emitter follower 131 absorbs or supplies a change in current to maintain the quiescent output current of the $G_m$ amplifier constant.

It will be apparent to those skilled in the art that the current from the current source and the current into the current sink may change with time, temperature, component aging or as a function of the common mode input voltage. By generating a floating power supply with the Zener diodes 132 and 133, the operating output current of the $G_m$ amplifier 23 will remain constant and any change between the current from the source and/or current into the sink will show up as a change in the collector current of the second emitter follower 131. By employing the emitter follower 131 in this manner, the tolerances of the components in the current source and current sink may be relaxed and thus they do not have to be selected by testing.

The use of current generators is not essential to the operation of the $G_m$ amplifier 23, but they provide a simple manner in which to obtain a floating power supply in conjunction with the two Zener diodes 132 and 133 when driven by the common mode voltage follower 22. Alternative types of floating power supplies for the $G_m$ amplifier 23 may be employed. Thus, rather than a pair of Zener diodes plus a current source and a current sink driven by the common mode voltage follower 22, a pair of batteries driven by the common mode voltage follower 22 as illustrated in FIG. 3*a* may be employed. Furthermore, two voltages generated from a floating secondary of a power transformer whose AC voltage is rectified and filtered, and preferably regulated, and then driven by the common mode voltage follower 22 as generally illustrated schematically in FIG. 3*b* may be used.

The $G_m$ amplifier 23 has a first common emitter stage including the transistors 136 and 137 as noted above, and has a second common emitter stage including transistors 155 and 156. The collectors of the transistors 136 and 137 are coupled through resistances to a potentiometer 157, the arm of which is connected to the line 47. The emitter of the transistor 137 is connected through resistances 158 and 159 to the line 48, and the emitter of the transistor 136 is connected through a variable resistance 160 and a resistance 161 to the line 48. The variable resistance 160 may be adjusted to balance the base-emitter voltages of the transistors 136 and 137. Terminals are provided at the junctions of the resistances 158, 159 and 160, 161, and a resistance shown in dashed lines, termed $R_{gm}$ may be coupled to these terminals. With no such resistance connected to these terminals, the amplifier 23 has a transconductance of one divided by the sum of the resistances 159 and 161. A resistance $R_{gm}$ may be coupled to these terminals to change the transconductance of the amplifier 23. For example, in an exemplary circuit where the resistances 159 and 161 each are 50,000 ohms, a 100,000 ohm resistance $R_{gm}$ provides a gain of 1/50,000 siemen.

In the typical prior art amplifier of the nature described herein, it is necessary that the resistances 159 and 161 be perfectly matched in order to achieve proper common mode voltage rejection. Such matching is not necessary with the amplifier of the present invention. It is desirable that precision wirewound resistances be used for these resistances 159 and 161 for gain and zero stability (referred to input) but even composition resistors can be used as far as achieving good common mode rejection is concerned.

The collector of the transistor 136 is connected to the base of the transistor 155, and the collector of the transistor 137 is connected to the base of the transistor 136. The emitters of the transistors 155 and 156 are coupled together and connected through a resistor 162 and a capacitor 163 to the line 47. The capacitor 163 aids in ensuring internal common mode stability. The collectors of the transistors 155 and 156 are connected through resistances to the line 48.

Rolloff circuits 165 and 166, each including a resistance in series with a capacitor, are coupled between the base and collector of the respective transistors 155 and 156 and serve as differential and common mode gain roll-offs within the $G_m$ amplifier 23. The collector of the transistor 155 is connected to the gate of a FET (field effect transistor) 167, and the collector of the transistor 156 is connected to the gate of a FET 168. These FETs are used as source followers, when considering the feedback (or loop gain) in the $G_m$ amplifier 23, and have essentially unity gain; but when considering the output stage of the $G_m$ amplifier 23, then the FETs are used as common source stages. The source-drain electrodes of the FET 167 are coupled between an output line 169 and a line 170 coupled back to the junction between the resistors 160 and 161. The source-drain electrodes of the FET 168 are connected between an output line 171 and a line 172 which is connected back to the junction of the resistors 158 and 159.

The output lines 169 and 171 of the amplifier 23 are connected through respective resistors 174 and 175 to the bases of respective transistors 176 and 177 which comprise a differential input stage of the $R_m$ amplifier 24. This amplifier is a differential amplifier connected in a differential operational configuration. A switch 178 has its movable contact connected to the line 171 and a plurality of stationary contacts coupled to a string of capacitors 179, the other terminals of which are connected to the line 169. These capacitors and the switch 178 form a first bandwidth control circuit and provide a single pole filter giving a 6 db. per octave rolloff.

A potentiometer 181 is connected through resistances 182 and 183 to the responsive lines 171 and 169, and the movable contact of this potentiometer is connected to the positive voltage supply line 77. The line 171 is connected through resistances 184 and 185 to ground 34, and the line 169 is connected through resistances 186 and 187 to a feedback line 188 of the amplifier 24. The potentiometer 181 provides for offset adjustment and is adjusted to zero the output of the amplifier 24. This potentiometer in conjunction with the resistors 182 and 183 provide quiescent drain current to the FETs 167 and 168 and establish a voltage across these FETs higher (e.g., 15 volts higher) than the expected common mode voltage. The resistors 182 and 183 establish the input voltage (e.g., +15 volts) of the amplifier 24 to allow a sufficient common mode voltage swing of the amplifier 23. The resistors 184 plus 185 and 186 plus 187 are feedback resistors which determine the transresistance of the amplifier 24 with switch 193 disconnected.

In the typical prior art amplifier, the resistors 184–185 and 186–187 must be perfectly matched to provide good common mode rejection; whereas such is not the case in the present amplifier. It is preferable that the ratio of the resistance 182 to the resistance 184 plus 185 be substantially equal to the ratio of the resistance 183 to the resistance 186 plus 187 to reduce the sensitivity of the amplifier to power supply variations, but this is not necessary for achieving accurate differential gain and good common mode rejection.

Second and third bandwidth control circuits 190 and 191, each having a control switch and a number of capacitors, also may be included so that another pole giving a total rolloff rate of 12 db./octave be provided. The switches of the first, second and third bandwidth circuits are ganged together. Either the first bandwidth circuit, the second and third bandwidth circuits, or all three may be used as desired.

The movable contact of a switch 193 is connected between the junction of the resistors 186 and 187, and a first stationary contact of the switch is coupled through resistors 194 and 195 in parallel to a line 196 between the resistors 184 and 185. The second stationary contact of this switch is connected through a fixed resistance 197 and a variable resistance 198 to the line 196, and the third contact is connected through a variable resistance 199 to the junction between the resistors 197 and 198. The first, or upper, contact may be termed a calibrate contact and the movable arm of the switch 193 is moved to this contact during initial calibration. The second and third stationary contacts respectively provide fine and coarse positions to enable fine and coarse gain adjustment of the amplifier 24 by means of the variable resistances 198 and 199.

The collectors of the transistors 176 and 177 are connected through resistors 201 and 202 of the line 77, and are connected to the bases of respective transistors 203 and 204 which provide a second differential stage of the amplifier 24. A pair of diodes 205 and 206 are oppositely connected across the collectors of the transistors 176 and 177. The emitters of these transistors are connected through respective resistances 207 and 208 to the negative voltage line 78, and a resistor 209 and capacitor 210 are connected in parallel across these emitters.

The emitters of the transistors 203 and 204 are connected through a resistance 212 to the line 77. The collector of the transistor 203 is connected through resistors 213 and 214 to the line 78, and a capacitor 215 is connected from the junction of these resistors to the collector of the transistor 176. A capacitor 216 is connected between the base and collector of the transistor 204, and the collector of this transistor is connected to a current limiting network 217.

A transistor 218, capacitor 219, a resistor 220 and the resistor 214 comprise a current source which aids in converting the differential signal from the second stage of the amplifier 24 to a single ended output without reducing gain. The current limiting network 217 includes diodes 222 and 223 connected in series with a resistor 224, a pair of diodes 225 and 226 and a pair of resistors 227 and 228. This network provides current limiting in case of a short circuit on the output of the amplifier 24.

The collectors of the transistors 204 and 218 are connected to the bases of respective transistors 230 and 231, the collectors of which are connected to the lines 77 and 78, and the emitters of which are connected through the resistors 227 and 228 to an output line 223. The transistors 230 and 231 comprise a complementary symmetry emitter follower. In a typical application, the output line 223 is connected to a galvanometer amplifier which provides a buffered output to drive a meter, and is connected through an active filter to a high-level commutator.

Amplifiers constructed in accordance with the teachings of the present invention may have a range of switchable gains from one to five thousand by providing a plurality of selectable resistors, $R_{gm}$, and a range of switchable bandwidths from 1 hertz to 100,000 hertz. Overall gain is given by the expression Gain=$G_m \times R_m$. Defining the common mode voltage as the average of the voltages on the two signal input lines with respect to output ground, common mode rejection of 1,000 times gain with a 1,000 ohm source imbalance, or 2,000 times gain with a balanced source up to 1,000 ohms, is obtainable. The maximum common mode voltage for linear measurements is plus or minus 10 volts peak. The differential input impedance is as high as 20 megohms resistance shunted by 100 picofarads. The input signal source may be either floating or grounded. A full-scale differential input voltage of plus or minus 10 volts divided by the gain setting may be accepted for linear operation.

The present embodiments of this invention are to be considered in all respects as illustrative and not restrictive.

What I claim is:

1. A direct-coupled differential amplifier having a data input adapted to receive a differential signal voltage and a common mode voltage impressed thereon, said amplifier comprising first amplifier means for supplying an output current proportional to said differential signal and having differential signal input terminals and power supply input terminals, means coupling said signal input terminals of said first amplifier means to said data input, and said first amplifier means having output terminals for providing said output current therefrom, impedance means coupled with said data input for deriving said common mode voltage, said impedance means having an intermediate terminal at which said common mode voltage may be sensed, and power supply means coupled with said intermediate terminal of said impedance means for sensing said common mode voltage and providing output power supply voltages which are applied to said power supply input terminals of said first amplifier means to minimize the effect of said common mode voltage on said output current of said first amplifier means, said output voltages respectively comprising a predetermined voltage added with said common mode voltage and a predetermined voltage subtracted from said common mode voltage, said power supply means including a common mode voltage amplifier having an input coupled with said intermediate terminal of said impedance means and an output, and means for establishing said predetermined voltages coupling said output of said common mode voltage amplifier with said power supply input terminals of said first amplifier means.

2. An amplifier as in claim 1 wherein said impedance means comprises resistance means connected across said data input, said resistance means having an intermediate tap forming said intermediate terminal of said impedance means.

3. An amplifier as in claim 1 wherein said impedance means includes resistance means coupled in parallel with capacitive means, and said resistance and capacitive means each have an intermediate terminal connected together and forming said intermediate terminal of said impedance means, said capacitive means serving to decrease the high frequency common mode driving impedance presented to said common mode voltage amplifier.

4. An amplifier as in claim 1 including second amplifier means for providing an output voltage proportional to a current input thereto and having input and output terminals, said input terminals of said second amplifier means being coupled with the output terminals of said first amplifier means, and said output terminals of said second amplifier means providing said output voltage.

5. An amplifier as in claim 4 wherein said output current of said first amplifier means is a differential output current, and said second amplifier means converts said differential output current of said first amplifier means to a single ended output voltage at the output of said second amplifier means, and said second amplifier means includes variable reactive means to control the dynamic response thereof to signal received thereby.

6. A direct-coupled differential amplifier for amplifying data signals applied at a data input thereof and providing amplified output signals at the output thereof while discriminating against common mode voltage signals at the input thereof, said amplifier comprising first amplifier means for supplying an output current proportional to said data signals while discriminating against common mode voltage signals and having differential signal input terminals and power supply input terminals, means coupling said signal input terminals of said first amplifier means to said data input, and said first amplifier means having output terminals for providing said output current therefrom, impedance means coupled with said signal input terminals for deriving said common mode voltage signals, said impedance means having an intermediate terminal at which said common mode voltage signals may be sensed, power supply means coupled with said intermediate terminal of said impedance means for sensing said common mode voltage signals and providing output power supply voltages which are applied to said power supply input terminals of said first amplifier means to minimize the effect of said common mode voltage signals on said output current of said first amplifier means, said output voltages respectively comprising a predetermined voltage added with said common mode voltage signals and a predetermined voltage subtracted from said common mode voltage signals, said power supply means including a common mode voltage amplifier having an input coupled with said intermediate terminal of said impedance means and an output, and means comprising voltage determining means for establishing said predetermined voltages coupling said output of said common mode voltage amplifier with said power supply input terminals of said first amplifier means, and second amplifier means for providing an output voltage proportional to a current input thereto and having input and output terminals, said input terminals of said second amplifier means being coupled with the output terminals of said first amplifier means, said output terminals of said second amplifier means providing said amplified output signals of said direct-coupled amplifier.

7. An amplifier as in claim 6 wherein said common mode voltage amplifier includes follower means having a plurality of electrodes, means coupling a first of said electrodes to said intermediate terminal of said impedance means, means coupling a second of said electrodes to an external voltage supply, and means coupling a third of said electrodes forming the output of said common mode voltage amplifier to said voltage determining means.

8. An amplifier as in claim 7 wherein said voltage-determining means comprises a pair of zener diodes connected from said third electrode of said follower means respectively to said power supply input terminals of said first amplifier means.

9. An amplifier as in claim 8 wherein said impedance means comprises resistance means coupled across the signal input terminals of said first amplifier means and capacitive means coupled in parallel with said resistance means, said resistance means and said capacitive means each having an intermediate tap connected together forming said intermediate terminal of said impedance means, said capacitive means decreasing the high-frequency common mode driving impedance presented to said common mode voltage amplifier.

10. A direct-coupled differential amplifier for amplifying data signals at data input terminals thereof and providing amplified output signals at the output thereof while discriminating against common mode voltage signals at the input thereof, said amplifier comprising clamp means for protecting said differential amplifier in the event of an overdrive on said input terminals thereof, said clamp means including fuse means and voltage-establishing means for causing said fuse means to blow in the event of an overdrive voltage applied to said input terminals, first amplifier means for supplying an output current proportional to said data signals while discriminating against common mode voltage signals and having differential signal input terminals and power supply input terminals, means coupling said signal input terminals of said first amplifier means to said data input, and said first amplifier means having output terminals for providing said output current therefrom, impedance means coupled with said signal input terminals for deriving said common mode voltage signals, said impedance means have an intermediate terminal at which said common mode voltage signals may be sensed, power supply means coupled with said intermediate terminal of said impedance means for sensing said common mode voltage signals and providing output power supply voltages which are applied to said power supply input terminals of said first amplifier means to minimize the effect of said common mode voltage signals on said output current of said first amplifier means, said output voltages respectively comprising a predetermined voltage added with said common mode voltage signals and a predetermined voltage subtracted from said common mode voltage signals, said power supply means including a common mode voltage amplifier having an input coupled with said intermediate terminal of said impedance means and an output, and means comprising voltage determining means for establishing said predetermined voltages coupling said output of said common mode voltage amplifier with said power supply input terminals of said first amplifier means, and second amplifier means for providing an output voltage proportional to a current input thereto and having input and output terminals, said input terminals of said second amplifier means being coupled with the output terminals of said first amplifier means, said output terminals of said second amplifier means providing said amplified output signals of said direct coupled amplifier.

11. An amplifier as in claim 10 wherein said first amplifier means includes an amplifier coupled between said signal input terminals and said output terminals thereof, said amplifier of said first amplifier means including a first common emitter stage coupled to said signal input terminals, a second common emitter stage having an input coupled with said first common emitter stage, field effect transistor means coupled between the output of said second common emitter stage and said output terminals of said first amplifier means, and feedback means coupled from said field effect transistor means to said first common emitter stage.

12. An amplifier as in claim 10 wherein said impedance means comprises a pair of resistors coupled across said signal input terminals of said first amplifier means with the junction of said resistors forming said intermediate terminal coupled with the input of said common mode voltage amplifier, said voltage-determining means comprise zener diodes, and said common mode voltage amplifier includes an emitter follower having a plurality of electrodes, means coupling a first of said electrodes to said junction of said resistors, means coupling a second of said electrodes to an external voltage supply terminal, and means coupling a third of said electrodes respectively through said zener diodes to said power supply input terminals of said first amplifier means.

13. A direct-coupled differential amplifier having a data input adapted to receive a differential signal voltage and a common mode voltage impressed thereon, said amplifier comprising differential voltage to current amplifier means for supplying an output current proportional to said differential signal voltage and having differential signal input terminals and power supply input terminals, means coupling said signal input terminals of said amplifier means to said data input, and said amplifier means having output terminals for providing said output current therefrom, and power supply means coupled with said power supply input terminals of said differential voltage to current amplifier for establishing supply voltages on said input terminals, said power supply means comprising common mode voltage amplifier means coupled between said data input and said power supply input terminals, including (a) impedance means coupled across said data input and having an intermediate tap, (b) an output circuit comprising reference voltage establishing means coupled across said power supply input terminals and having an intermediate tap, and (c) amplifier means coupled between said intermediate tap of said impedance means and said intermediate tap of said output circuit, for applying to said power supply input terminals supply voltages comprising a reference voltage established by said reference voltage establishing means added to said common mode voltage at one of said power supply input terminals and subtracted from said common mode voltage at the other of said power supply input terminals.

14. A voltage-to-current amplifier for providing an output current proportional to a differential signal voltage comprising a signal input circuit for receiving a differential signal voltage and a common mode voltage impressed thereon, an output circuit for providing said output current as a function of said signal voltage, amplification means interconnecting said input and output circuits for amplifying said signal voltage, input voltage terminals adapted to be coupled to an external voltage supply, internal power supply terminals coupled to said amplification means for supplying a voltage to said amplification means for minimizing the effect of said common mode voltage, a current source and sink respectively coupled between said input voltage terminals and said internal power supply terminals, and voltage-determining means for establishing a predetermined reference voltage and coupled with said internal power supply terminals to cause said internal power supply terminals to supply to said amplification means voltages which are a function of a combination of said reference voltage and said common mode voltage.

15. A voltage-to-current amplifier comprising amplification means coupled between its input signal terminals and output signal terminals for amplifying an input signal voltage and supplying an output signal current, said amplification means including a first amplifier stage having input terminals which are coupled to said input signal terminals and having an output voltage gain stages in the forward link of said amplification means to provide a predetermined amount of loop gain and having an input coupled with the output of said first stage and having an output, an output transconductance stage coupled between the output of the voltage gain stages and said output signal terminals to convert the voltage signal to a current signal, and means for feeding back the output current signal from said output transconductance stage to a gain control conductance in said first amplifier stage.

16. An amplifier as in claim 14 wherein said amplification means includes a first common emitter stage coupled to said signal input, a second common emitter stage having an input coupled with said first common emitter stage, field effect transistor means coupled between the output of said second common emitter stage and said output signal terminals, and feedback means coupled from said field effect transistor means to said first common emitter stage.